US006820592B2

(12) United States Patent
Buck et al.

(10) Patent No.: US 6,820,592 B2
(45) Date of Patent: Nov. 23, 2004

(54) METHOD AND APPARATUS FOR CONTROLLING AN INTERNAL COMBUSTION ENGINE

(75) Inventors: Rainer Buck, Tamm (DE); Jens Damitz, Illingen (DE); Dirk Samuelsen, Ludwigsburg (DE); Ruediger Fehrmann, Leonberg (DE); Matthias Schueler, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/307,877

(22) Filed: Dec. 2, 2002

(65) Prior Publication Data

US 2003/0127073 A1 Jul. 10, 2003

(30) Foreign Application Priority Data

Dec. 1, 2001 (DE) .......................................... 101 59 017

(51) Int. Cl.$^7$ ................................................. F02B 3/12
(52) U.S. Cl. ............. 123/435; 123/406.41; 123/406.43; 123/299
(58) Field of Search ........................... 123/435, 406.41, 123/406.43, 406.42, 299

(56) References Cited

U.S. PATENT DOCUMENTS

| | | | | |
|---|---|---|---|---|
| 4,704,999 A | * | 11/1987 | Hashikawa et al. | 123/435 |
| 5,865,153 A | * | 2/1999 | Matsumoto | 123/299 |
| 6,196,184 B1 | * | 3/2001 | Przymusinski et al. | 123/299 |
| 6,230,683 B1 | * | 5/2001 | zur Loye et al. | 123/435 |
| 6,354,268 B1 | * | 3/2002 | Beck et al. | 123/435 |
| 6,378,487 B1 | * | 4/2002 | Zukouski et al. | 123/299 |

\* cited by examiner

*Primary Examiner*—Erick Solis
(74) *Attorney, Agent, or Firm*—Kenyon & Kenyon

(57) ABSTRACT

A method and an apparatus for controlling an internal combustion engine are described. At least one sensor serves to detect a first variable that characterizes the pressure in the combustion chamber of at least one cylinder. A second variable, which characterizes the maximum value of the change and/or the location of the maximum value of the change, is determined on the basis of this first variable. This second variable serves to control operating parameters of the internal combustion engine in an open-loop and/or a closed-loop manner.

15 Claims, 2 Drawing Sheets

METHOD AND APPARATUS FOR CONTROLLING AN INTERNAL COMBUSTION ENGINE

FIELD OF THE INVENTION

The present invention relates to a method and an apparatus for controlling an internal combustion engine.

BACKGROUND INFORMATION

German Patent Application No. 197 49 814 discloses a method and an apparatus for controlling an internal combustion in which a first variable that characterizes the pressure in the combustion chamber of at least one cylinder is detected using a sensor.

There are other conventional devices with which the cylinder pressures of internal combustion engines can be measured over time or with respect to crank angle. Additionally, conventional methods have been described which allow a determination during operation, from a high-resolution pressure signal, parameters that are then in turn used for individual-cylinder optimization of the engine process in terms of fuel consumption, emissions, and comfort as target variables.

These applications are usually referred to as cylinder-pressure-based engine control systems. Conventional functions include closed-loop control of peak pressure, knock, combustion center point, combustion onset, and misfire recognition.

Parameters for this purpose are usually the latter's absolute values or their relationships to specific points in time or angular positions, pressure differences with respect to the compression curve, pressure integrals and pressure-difference integrals, indicated work or indicated torque, or bandpass-filtered pressure curves integrated over an angle window.

SUMMARY OF THE INVENTION

It is provided, according to the present inventions, that in a method for controlling an internal combustion engine, at least a first variable that characterizes the pressure in the combustion chamber of at least one cylinder is detected using at least one sensor. On the basis of this first variable, a second variable is determined, the second variable characterizing the change in the first variable and/or the course of combustion. Open- and/or closed-loop control of operating parameters of the internal combustion engine is accomplished as a function of those two variables.

The first variable that is detected by means of a sensor may be the pressure in one or more of the combustion chambers. The second variable may be a variable derived from the first variable. It is particularly advantageous if the second variable characterizes the maximum value of the first variable and/or the maximum value of the change in the first variable and/or the position of the maximum values of the first variable. It is additionally advantageous if the second variable characterizes a heat curve, a combustion curve, a cumulative heat curve, a cumulative combustion curve (i.e., a net heat release rate, gross heat release rate, net heat release, gross heat release), a maximum value of and/or a maximum value of the change, a position of the maximum values of the heat curve, the combustion curve, the cumulative heat curve, and/or the cumulative combustion curve.

It is particularly advantageous if the gradient of the first variable is used as the second variable, i.e. if the second variable is definable on the basis of the derivative of the first variable.

A considerable gain in reliability is obtained if a control output is definable as a function of the comparison of the second variable to a threshold value. It is thereby possible to prevent the combustion chamber pressure from rising excessively, i.e. to avoid situations that might result in damage to the internal combustion engine.

It is also particularly advantageous if the boost pressure, the rail pressure, an air variable that characterizes the air quantity delivered to the internal combustion engine, and/or the duration and/or onset of at least one pre-injection, at least one main injection and/or at least one post-injection, is controlled in open- and/or closed-loop fashion as a function of the second variable.

According to the present invention, a variable that characterizes the course of combustion is determined, that variable is compared to a setpoint, and that the duration and/or onset of at least one pre-injection is definable on the basis of the comparison to the setpoint. This allows very accurate correction of the pre-injection during operation of the internal combustion engine.

In addition to the use of a combustion chamber pressure sensor, it is also advantageous to use a signal of a solid-borne sound sensor and/or of an ion current sensor, or a variable derived from those signals, for closed-loop control of the variable that characterizes the combustion process.

DETAILED DESCRIPTION

Figure 1:
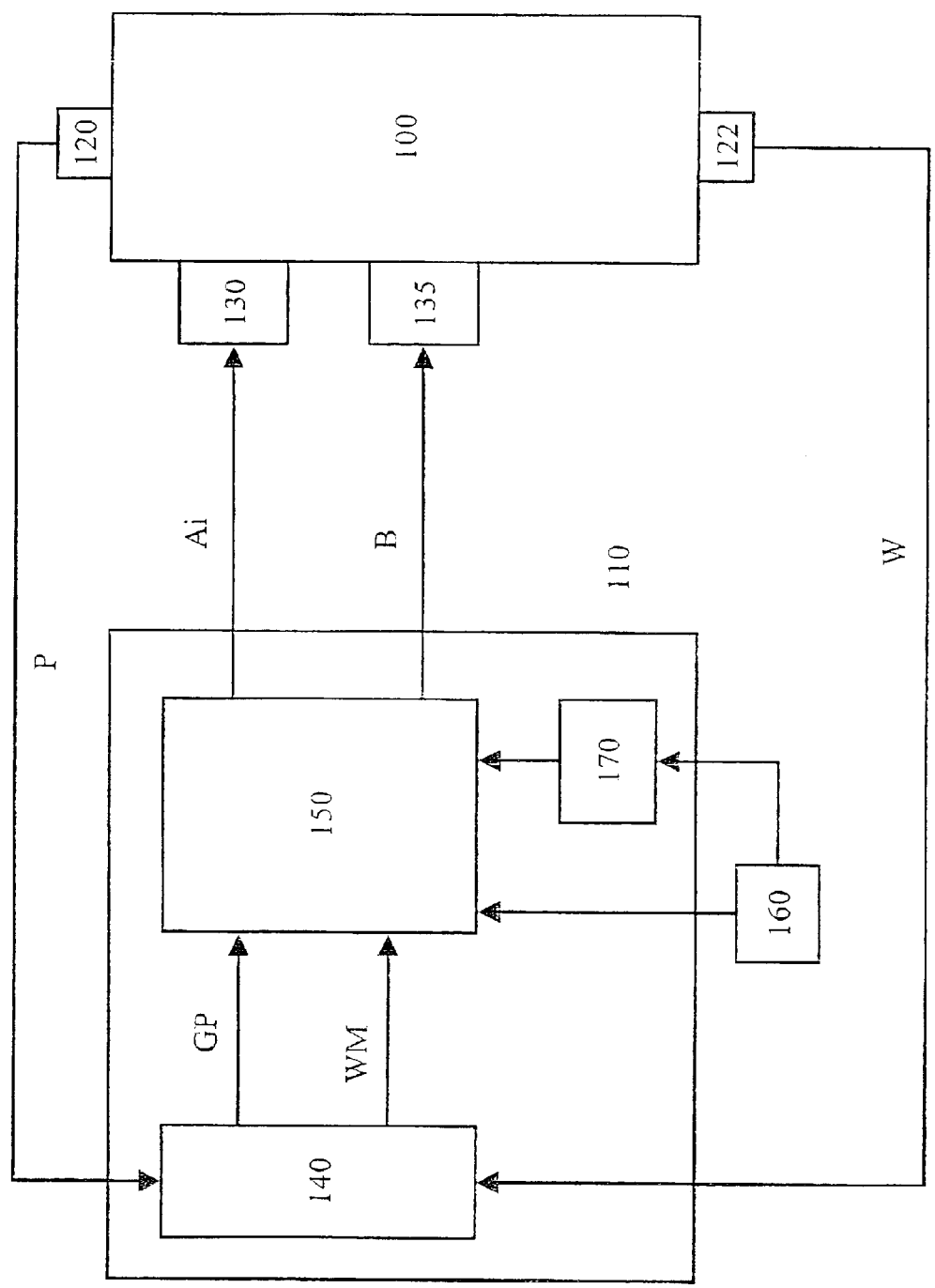
FIG. 1 is a block diagram of a device for carrying out the method of controlling an internal combustion engine according to an embodiment of the present invention.

FIG. 1 depicts the procedure according to the present invention with reference to a block diagram. An internal combustion engine is designated 100. Positioned on the internal combustion engine is at least one pressure sensor 120 and an angle sensor 122. Pressure sensor 120 supplies a signal P that characterizes the pressure in at least one combustion chamber of the internal combustion engine. In a first embodiment only one pressure sensor is provided, which is positioned on a representative cylinder and characterizes the pressure in that cylinder. In a second embodiment, there is positioned on each cylinder of the internal combustion engine a pressure sensor that delivers a respective signal characterizing the pressure in the combustion chamber of the respective cylinder.

Angle sensor 122 may be positioned on the crankshaft of the internal combustion engine and supplies a high-resolution angle signal W relating to the angular position of the crankshaft. Alternatively, the angle sensor can also be positioned on the camshaft of the internal combustion engine.

Also positioned on the internal combustion engine are a first adjuster 130 and a second adjuster 135. The adjusters and the sensors are connected to a control unit 110.

Signal P of pressure sensor 120 and signal W of angle sensor 122 arrive at an evaluation unit 140 that may constitute a subunit of control unit 110. Evaluation unit 140 supplies signals GP and WM to a functional unit 150. The functional unit in turn acts upon first adjuster 130 with a first control output Ai and on second adjuster 135 with a second control output B. First control output Ai may be an individual-cylinder control output that is individually definable for each cylinder. The second control output is an engine-wide control output for activating adjuster 135, which controls a global variable.

First control outputs Ai may be the activation durations and/or activation onsets of an injection. Provision can be made for subdividing an injection operation of the working cycle into several sub-injections. In this context, control output Ai is the activation duration and/or activation onset of at least one of the sub-injections. Usually at least one main injection, at least one pre-injection, and at least one post-injection are provided as the sub-injections. The procedure according to the present invention is advantageous in particular in the case of the main injection and the pre-injection. In addition or alternatively to the activation duration and/or activation onset, the injection rate curve of the sub-injections can also be defined. This is the change in injection quantity as a function of time or angular unit.

The engine-wide control outputs used are, in particular, the boost pressure and/or the control outputs influencing the air quantity delivered to the internal combustion engine, for example the exhaust gas recirculation rate and/or the injection pressure and/or rail pressure.

Also delivered to functional unit 150 are the output signals of a further functional unit 170 which, like functional unit 150, processes the output signals of further sensors 160 that can also be positioned in the region of the internal combustion engine. Further functional unit 170 can be, for example, a control unit for controlling exhaust gas recirculation or one of the aforesaid global control outputs.

The cylinder pressure curves Pi of all the cylinders may be detected individually using combustion-chamber pressure sensors. An alternative is that only one cylinder, treated as representative, is equipped with a pressure detection system. In either case, a high-resolution angle signal W is used as a reference variable for calculating the angular position and the gradient. Alternatively, the time can also be used to calculate only a gradient.

The pressure P and angle W sensor signals are delivered to evaluation unit 140, which may be a component of the engine control system. The evaluation unit 140 generates feature variables GP, which may be delivered as actual values to a closed-loop control system and/or may be limited to permissible values by comparison to one or more threshold values.

One or more of the following variables may be determined: the absolute maximum of the pressure gradient, (and) the angular position of the maximum pressure gradient. It is particularly advantageous if, in addition, relative maxima of the pressure gradient and/or of its corresponding angular positions are also determined.

The absolute maximum may be determined within different angular ranges. This makes possible, for example, deliberate allocation to different sub-injections.

Control unit 110 contains functional unit 150, which performs closed-loop control of the pressure gradient. In an example embodiment, the functional unit functions such that when permissible limit values are exceeded, an entry is made in a fault memory, or a controlled intervention is made in such a way that the cylinder pressure gradient decreases. Coordination of the control outputs in accordance with a suitable intervention strategy is accomplished in consideration of further input variables that derive either from sensors or from other functions of the engine control system. Conventional cylinder-pressure-based features, for example pressure differences with respect to the compression curve or average pressure contributions from different combustion phases, can also be employed as an indication of individual injection quantities in order to detect the individual effects of the injections. In that respect, the invention described here expands upon known cylinder pressure-based engine control systems.

In order to assess possible hazards to elements of the internal combustion engine, for example the piston ring seal, the absolute magnitude of the cylinder pressure may be also be used in the context of the evaluation.

Ordinary cylinder-pressure-based closed-loop control systems give no consideration to the cylinder-pressure signal differentiated as to time or crank angle, or consider it only in order to recognize combustion onset. The cylinder-pressure signal differentiated as to time and/or as to crank angle contains, directly and indirectly, additional information about the kind of energy conversion and its effect on engine behavior, e.g. in terms of combustion noise or piston ring stress.

According to the present invention, the kind of energy conversion and its effect on engine behavior may be implemented as a function of injection characteristics such as the quantity and activation onset of the various sub-injections and/or the injection rate curve by way of control unit 110 and thus maintained in a closed control loop. Optimization of the internal combustion engine during operation is thus extended to additional target variables.

According to the present invention, an evaluation is made of the pressure signal in terms of the pressure gradient GP feature variable. This may be accomplished by differentiation over the angle W using the formula dP/dW, or by differentiation over time t using the formula dP/dt. In particular, an absolute maximum pressure gradient or several relative maximum pressure gradients, and their positions are determined.

If the pressure gradient exceeds defined critical limit values or if the pressure gradient does not attain defined setpoints, a correction is performed by way of adjusting actions of the engine control system. This correction is configured as an open-loop control system and, in an example embodiment depicted in FIG. 2, as a closed-loop control system. An open-loop control system may be provided if an adjusting action is performed only in the context of a limit value monitor.

The maximum pressure rise that occurs in a cylinder considerably influences the combustion noise, and thus also the total acoustic emission, of the internal combustion engine. Application of the setpoints in a conventional engine control system can indirectly also take into account compliance with specific limit values for the combustion noise target variable. As a result of various effects, however, an individual internal combustion engine including its injection device deviates from the reference variables (thus only indirectly defined) of the maximum pressure gradient. These effects are, in particular, the totality of all tolerance, wear, and aging phenomena; (and) operating conditions that are not (or not sufficiently) taken into account in the setpoints.

In addition, the pressure curves in an internal combustion engine can differ from cylinder to cylinder as a result of tolerances, wear, or design-related non-identical operating conditions, for example the introduction of recirculated exhaust gas or the effects of a swirled flow that influences mixture preparation. A conventional application must therefore take these overall variations into account in the form of safety factor increases.

By detecting the maximum pressure gradient and its position, compliance with a defined combustion noise level can be improved in the form of a closed-loop control system, even if the aforesaid deviations occur.

Figure 2:
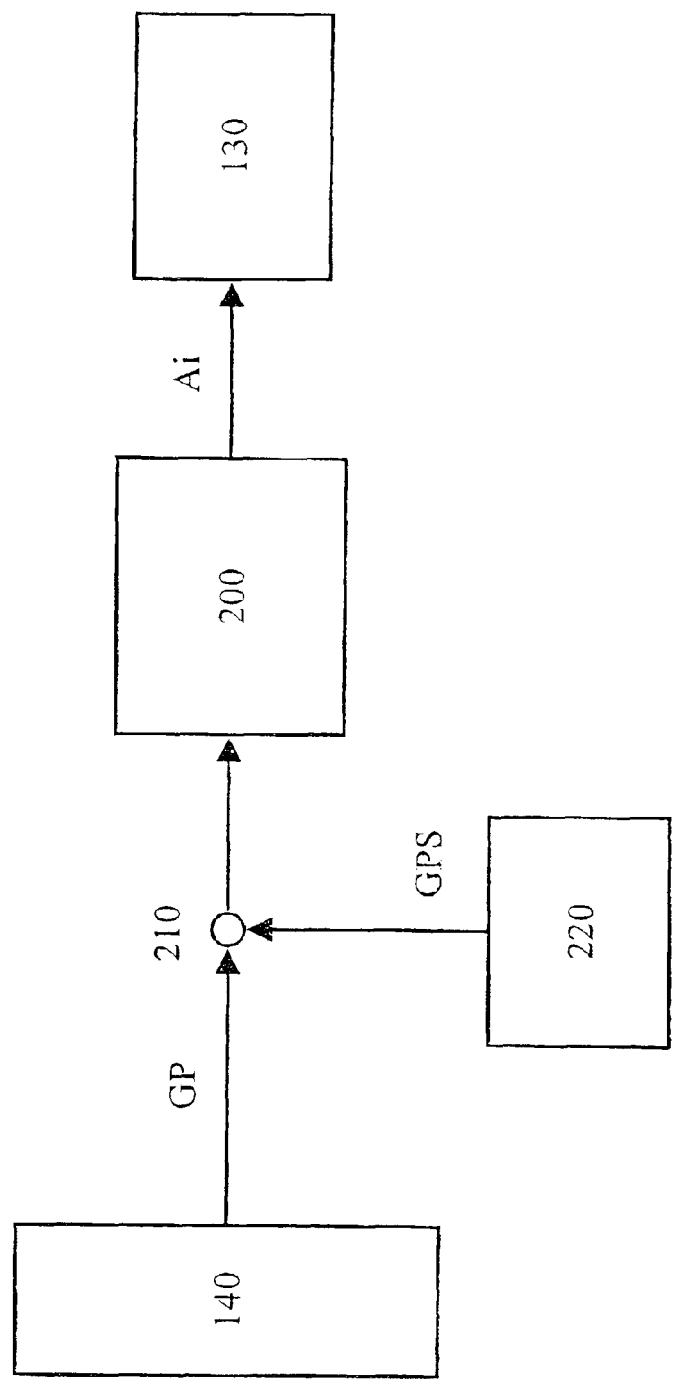
FIG. 2 shows an example closed-loop controller structure according to the present invention.

A closed-loop control system of this kind is depicted by way of example in FIG. 2. Elements already described in FIG. 1 are labeled with corresponding reference characters. Evaluation unit 140 makes an actual value GP available at a node. A setpoint GPS that is provided by a setpoint definition function 220 is applied to the second input of node 210. The output signal of node 210 is applied to a closed-loop controller 200 that in turns acts upon the first and/or second adjuster 130 with activation signals Ai.

In an example embodiment, setpoint definition function 220 defines a permissible pressure gradient as a function of the operating point. On the basis of the deviation between setpoint GPS and the actual pressure gradient GP, closed-loop controller 220 provides a signal for activating the injectors. Closed-loop controller 200 may define a pre-injection quantity. The pre-injection quantity, which considerably influences the pressure rise, may be defined in such a way that the pressure gradient does not exceed a specific value. That value is selected so that the noise emissions do not negatively affect comfort and are within legislatively stipulated limit values.

According to the present invention, provision is made for the pre-injection curve to be regulated to a specific setpoint. In other words, the pre-injection duration is lengthened or shortened until the pre-injection curve exhibits an expected profile. It is not the pre-injection curve directly, but rather a substitute variable that is well-correlated with the curve, that is regulated to the setpoint. The substitute variable is selected so as to minimize noise emissions and exhaust emissions. With this procedure, errors in the pre-injection quantity that result from aging effects and/or sample variations of the engine and/or injection system can be corrected during engine operation. In addition, this adaptation can be performed for all operating points, i.e. for different rail pressures, engine speeds, and loads.

The pre-injection quantity may be regulated to a value by way of the pressure gradient. The setpoint for the pressure gradient of this closed-loop control system is selected so that the pre-injection quantity is as large as is necessary to limit noise emissions. On the other hand, the setpoint of the pressure gradient of this closed-loop control system is selected so that the pre-injection quantity is sufficiently small to minimize exhaust emissions.

As an alternative to the pressure gradient, other variables that characterize the pre-injection curve can also be used. In particular, solid-borne sound sensors that can directly detect combustion noise, and/or ion current sensors, can be used.

When a solid-borne sound sensor and/or an ion current sensor is used, a signal that occurs in a specific angular region of the crankshaft may be used as actual value GP.

According to one example embodiment, only specific frequency ranges of the signal are evaluated in this context. In particular, the solid-borne sound power level is evaluated over a specific angular region and/or frequency range. In the case of an ion current sensor, the signal gradient, i.e. the change in the signal over the angular position of the crankshaft may be used. This variable may then be averaged over several measurements.

It is thereby possible to resolve the conflict of goals that exists in the application of the pre-injection quantity, between increasing noise emission that occurs if the pre-injection quantity is too small, and increasing emissions, especially particles, that occur if the pre-injection quantity is too great. With no change in the noise level of a vehicle, a contribution can thus be made toward limiting the variation in emissions between as-new and older conditions, and toward an overall reduction in emissions. A function of this kind thus represents an optimization of the pre-injection.

For this function, it is advantageous to use the combustion chamber pressure gradient rather than other variables, such as the "ignition distortion" feature that can also be derived from the cylinder pressure curve and the activation times of the injection device, since the pressure gradient is a direct indicator of the engine noise target variable. Ignition distortion, like the pressure gradient, is determined by a multitude of operating parameters such as fuel grade, final compression temperature, and exhaust gas recirculation rate, so that defining an optimum for the ignition distortion, with the goal of noise minimization, is a great deal more difficult.

It is particularly advantageous if the procedure described above is performed for each cylinder. This means that the closed-loop control system adapts each individual combustion event of each cylinder to the reference parameters during operation.

It is particularly advantageous if, in the event of impermissible deviations, in particular if specific limit values are exceeded, actions are initiated to protect the internal combustion engine. The limit values are defined in such a way that, for example, the functionality or service life of the internal combustion engine is not jeopardized.

In the embodiment described so far, the first derivative of the combustion chamber pressure is used as the input variable. In particular, the absolute maximum of the cylinder pressure gradient, its angular position, the further relative maxima, and their angular positions, are evaluated.

Alternatively or additionally, individual or multiple variables that are determined on the basis of the measured pressure curve may be employed as features proportional to the combustion noise.

Essential variables are the maximum values and/or the angular position of higher derivatives, in particular the second derivative, of the cylinder pressure curve as a function of crank angle and/or as a function of time.

In addition, thermodynamic feature variables that can be calculated from the pressure curve, for example the heat curve, combustion curve, cumulative heat curve, and/or cumulative combustion curve, may be suitable.

The heat curve refers to the heat transferred, as a function of crank angle, to the working gas as a result of combustion. The unit of the heat curve is usually J/°KW, or corresponding conversions. The combustion curve represents an analog variable. In contrast to the heat curve, however, the combustion curve contains all of the heat released during the combustion event. The combustion curve is therefore greater than the heat curve, by an amount substantially equal to the heat flowing out through the combustion chamber walls per unit of angle.

With a knowledge of the engine geometry data and the caloric data for the combustion gas and fuel, and by application of the first law of thermodynamics, the heat curve and/or combustion curve are calculated from the cylinder pressure curve using certain model assumptions.

Corresponding to the aforementioned definitions of the heat curve, the cumulative heat curve constitutes the integral of the heat curve over the crank angle. The cumulative combustion curve corresponds to the integral of the combustion curve over the crank angle.

Further variables are the maximum values and/or their angular positions of various derivatives, in particular the first derivative and the second derivative, of the aforesaid variables, for example the heat curve, combustion curve, cumulative heat curve, or cumulative combustion curve, with respect to crank angle or with respect to time.

Further variables are also calculated from a combustion curve model. These are, in particular, variables that characterize the injection mass curve, for example the fuel mass injected at combustion onset or the maximum value of the injection curve. The value of the heat curve minimum constitutes a simple indicator of the fuel mass injected prior to the onset of combustion.

The combustion curve is determined by means of a model that includes thermodynamic consideration of the combustion chamber. The most essential measured variable is the cylinder pressure. For example, if the introduction of fuel into the combustion chamber (which corresponds to the mass inflow into the combustion chamber) and subsequent vaporization (which corresponds to the heat outflow from the working gas) are not (sic) modeled, the combustion curve calculated from the cylinder pressure curve then shows a characteristic minimum at the onset of injection.

In an example embodiment, the energy magnitude of this minimum is converted into a proportional injection mass $\Delta mB$: $|QBmin|=\Delta mB*r$, where r corresponds to the specific heat of vaporization of the fuel.

If the model for calculating the combustion curve also encompasses a submodel for the introduction and vaporization of the fuel, data that allow a reconstruction of the injection curve are then used as measured variables. In a common rail system at least the rail pressure and the activation duration, as well as geometry parameters for the injection system, are considered. For entirely or partially cam-controlled injection systems, the engine speed rather than the rail pressure are considered. In both cases, it is advantageous to take into account fuel temperature as a measured variable.

What is claimed is:

1. A method for controlling an internal combustion engine having at least one cylinder, comprising:
   detecting at least one first variable that characterizes a pressure in a combustion chamber of the at least one cylinder using at least one sensor;
   determining a second variable on the basis of the at least one first variable, the second variable characterizing a change in the at least one first variable; and
   controlling operating parameters of the internal combustion engine as a function of the second variable in at least one of an open-loop manner and a closed-loop manner, including controlling an onset of at least one partial injection as a function of the second variable.

2. The method according to claim 1, further comprising:
   defining the second variable as a derivative of the at least one first variable.

3. The method according to claim 1, further comprising:
   defining an actuating variable as a function of a comparison of the second variable to a threshold value.

4. The method according to claim 1, further comprising:
   defining an actuating variable as a function of a comparison of the second variable to a setpoint value.

5. The method according to claim 1, further comprising:
   controlling a rail pressure as a function of the second variable.

6. The method according to claim 1, wherein the second variable includes at least one of a maximum value of the at least one first variable, a maximum value of a change in the at least one first variable, and a position of the maximum value of the at least one first variable.

7. The method according to claim 1, further comprising:
   determining at least one of a heat curve, a combustion curve, a cumulative heat curve, and a cumulative combustion curve as the second variable on the basis of the first variable.

8. The method according to claim 7, wherein the second variable characterizes at least one of a maximum value, a maximum value of a change, and a position of maximum values of at least one of the heat curve, the combustion curve, the cumulative heat curve, and the cumulative combustion curve.

9. A method for controlling an internal combustion engine having at least one cylinder, comprising:
   detecting at least one first variable that characterizes a pressure in a combustion chamber of the at least one cylinder using at least one sensor;
   determining a second variable on the basis of the at least one first variable, the second variable characterizing a change in the at least one first variable and being formed as a function of a derivative of the at least one first variable; and
   controlling operating parameters of the internal combustion engine as a function of the second variable in at least one of an open-loop manner and a closed-loop matter, including controlling a boost pressure as a function of the second variable.

10. A method for controlling an internal combustion engine having at least one cylinder, comprising:
    detecting at least one first variable that characterizes a pressure in a combustion chamber of the at least one cylinder using at least one sensor;
    determining a second variable on the basis of the at least one first variable, the second variable characterizing a change in the at least one first variable and being formed as a function of a derivative of the at least one first variable; and
    controlling operating parameters of the internal combustion engine as a function of the second variable in at least one of an open-loop manner and a closed-loop matter, including controlling an air variable that characterizes an air quantity delivered to the internal combustion engine as a function of the second variable.

11. A method for controlling an internal combustion engine having at least one cylinder, comprising:
    detecting at least one first variable that characterizes a pressure in a combustion chamber of the at least one cylinder using at least one sensor;
    determining a second variable on the basis of the at least one first variable, the second variable characterizing a chance in the at least one first variable; and
    controlling operating parameters of the internal combustion engine as a function of the second variable in at least one of an open-loop manner and a closed-loop matter, including controlling, as a function of the second variable, an onset of at least one of: i) a pre-injection, ii) at least one main injection, and iii) at least one post-injection.

12. A method for controlling an internal combustion engine, comprising:
    determining a variable that characterizes a change in pressure in a combustion chamber;
    comparing the variable to a setpoint value; and
    defining an onset of at least one pre-injection on the basis of the comparison to the setpoint value.

13. A method for controlling an internal combustion engine, comprising:

determining a variable that characterizes a change in pressure in a combustion chamber;

comparing the variable to a setpoint value; and defining an onset of at least one pre-injection on the basis of the comparison to the setpoint value, wherein the variable includes at least one of a signal of a solid-borne sound sensor, a signal of an ion current sensor, and a variable derived from those signals.

14. An apparatus for controlling an internal combustion engine, comprising:

at least one sensor for detecting a first variable that characterizes a pressure in a combustion chamber of at least one cylinder; and an arrangement for determining a second variable on the basis of the first variable, the second variable characterizing a change in the first variable, as a function of the second variable, in at least one of an open-loop manner and a closed-loop manner, the arrangement controlling an onset of at least one partial injection.

15. A method for controlling an internal combustion engine, comprising:

detecting at least one first variable that characterizes a pressure in a combustion chamber of the at least one cylinder using at least one sensor;

determining a second variable on the basis of the at least one first variable, the second variable characterizing a change in the at least one first variable;

controlling an onset of a fuel injection as a function of the second variable.

\* \* \* \* \*